US012612337B2

(12) United States Patent
Hamamura

(10) Patent No.: US 12,612,337 B2
(45) Date of Patent: Apr. 28, 2026

(54) COMPOSITE MATERIAL AND METHOD FOR PRODUCING COMPOSITE MATERIAL

(71) Applicant: Each DreaM Co., Ltd., Ichinomiya (JP)

(72) Inventor: Hideo Hamamura, Ichinomiya (JP)

(73) Assignee: EACH DREAM CO., LTD., Ichinomiya (JP)

( * ) Notice: Subject to any disclaimer, the term of this patent is extended or adjusted under 35 U.S.C. 154(b) by 477 days.

(21) Appl. No.: 18/019,103

(22) PCT Filed: Sep. 18, 2020

(86) PCT No.: PCT/JP2020/035627
§ 371 (c)(1),
(2) Date: Feb. 1, 2023

(87) PCT Pub. No.: WO2022/030026
PCT Pub. Date: Feb. 10, 2022

(65) Prior Publication Data
US 2024/0034681 A1      Feb. 1, 2024

(30) Foreign Application Priority Data
Aug. 3, 2020      (JP) ................................. 2020-131656

(51) Int. Cl.
| | |
|---|---|
| *C04B 28/26* | (2006.01) |
| *C04B 14/04* | (2006.01) |
| *C04B 20/00* | (2006.01) |
| *C04B 40/00* | (2006.01) |

(52) U.S. Cl.
CPC ............ *C04B 28/26* (2013.01); *C04B 14/043* (2013.01); *C04B 20/004* (2013.01); *C04B 20/0048* (2013.01); *C04B 40/0082* (2013.01)

(58) Field of Classification Search
CPC ..... C04B 28/26; C04B 14/043; C04B 20/004; C04B 20/0048; C04B 40/0082; C04B 14/42; C04B 14/4668; C04B 2111/28; C04B 28/06; C04B 7/32; C04B 28/006
See application file for complete search history.

(56) References Cited

U.S. PATENT DOCUMENTS 3,508,940 A * 4/1970 Webb ..................... C04B 28/26
252/62

FOREIGN PATENT DOCUMENTS

| | | |
|---|---|---|
| JP | S61251554 A | 11/1986 |
| JP | S62246880 A | 10/1987 |
| JP | H05330889 A | 12/1993 |
| JP | 2000281424 A | 10/2000 |
| JP | 2000318071 A | 11/2000 |
| JP | 2003165763 A | 6/2003 |
| JP | 2016065408 A | 4/2016 |
| KR | 20040079228 A | 9/2004 |

OTHER PUBLICATIONS

Japanese Office Action (Notice of Reasons for Refusal) issued on Aug. 20, 2024 in the corresponding Japanese patent application No. 2022-541102 and its machine-generated English translation, 5 pages.
Taiwanese Office Action (Examination Report) issued on Sep. 3, 2024 in the corresponding Taiwanese patent application No. 109132383 and its machine-generated English translation, 10 pages.
Extended European Search Report, issued on Jul. 30, 2024, in the corresponding European patent application No. 20948450.0, 6 pages.
Chinese Seccond Office Action issued on Nov. 29, 2024 in the corresponding Chinese patent application No. 202080104156.8 and its machine-generated English translation, 20 pages.
Korean First Office Action issued on Jan. 18, 2025 in the corresponding Korean patent application No. 10-2023-7006728 and its machine-generated English translation, 7 pages.
Chinese Office Action issued on May 31, 2024 in the corresponding Chinese patent application No. 202080104156.8 and its machine-generated English translation, 19 pages.
International Search Report, received in PCT/JP2020/035627, mail date Nov. 17, 2020, 5 pages.
PCT International Preliminary Report on Patentability and Written Opinion, received in PCT/JP2020/035627, date of issuance Feb. 7, 2023, 7 pages.
Chinese Office Action issued on Feb. 28, 2025 in the corresponding Chinese patent application No. 202080104156.8 and its machine-generated English translation, 15 pages.
Taiwanese Office Action issued on Jun. 3, 2025 in the corresponding Taiwanese Patent Application No. 109132383 and its machine-generated English translation, 12 pages.
Indian Office Action issued on Nov. 3, 2025 in the corresponding Indian Patent Application No. 202337013103 and its machine-generated English translation, 12 pages.
Taiwanese Office Action issued on Nov. 25, 2025 in the corresponding Taiwanese Patent Application No. 109132383 and its machine-generated English translation, 12 pages.
Chinese Reexamination Notification issued on Feb. 9, 2026 in the corresponding Chinese Patent Application No. 202080104156.8 and its machine-generated English translation, 16 pages.

* cited by examiner

*Primary Examiner* — Anthony J Green
(74) *Attorney, Agent, or Firm* — Hayes Soloway PC

(57) ABSTRACT

A composite material containing a base material and an inorganic fiber, wherein the base material contains (a) a dehydration condensation reaction product of sodium silicate and (b) alumina cement. A method for producing a composite material containing a base material and an inorganic fiber, the method including: impregnating the inorganic fiber with a solution containing (A) sodium silicate and (B) alumina cement; and causing a dehydration condensation reaction of the component (A) to occur by heating.

5 Claims, No Drawings

COMPOSITE MATERIAL AND METHOD FOR PRODUCING COMPOSITE MATERIAL

CROSS-REFERENCE TO RELATED APPLICATIONS

The present international application claims priority based on Japanese Patent Application No. 2020-131656 filed with the Japan Patent Office on Aug. 3, 2020, and the entire contents of Japanese Patent Application No. 2020-131656 are incorporated herein by reference.

TECHNICAL FIELD

The present disclosure relates to a composite material and a method for producing a composite material.

BACKGROUND ART

FRP (Fiber Reinforced Plastics) has been conventionally used in fields such as railway vehicles, ships, and water facilities. FRP is a composite material containing a base material made of a resin and reinforcing fibers. A technique related to FRP is disclosed in Patent Literature 1.

CITATIONS LIST

Patent Literature

Patent Literature 1: JP 2000-318071 A

SUMMARY OF INVENTION

Technical Problems

A composite material having higher incombustibility than that of FRP is desired. In one aspect of the present disclosure, it is preferable to provide a composite material having high incombustibility and a method for producing a composite material.

Solutions to Problems

One aspect of the present disclosure is a composite material containing a base material and an inorganic fiber. The base material contains (a) a dehydration condensation reaction product of sodium silicate and (b) alumina cement. The composite material according to one aspect of the present disclosure has high incombustibility.

Another aspect of the present disclosure is a method for producing a composite material containing a base material and an inorganic fiber. In the method for producing a composite material according to another aspect of the present disclosure, the inorganic fiber is impregnated with a solution containing (A) sodium silicate and (B) alumina cement, and a dehydration condensation reaction of the component (A) is caused to occur by heating. According to the method for producing a composite material according to another aspect of the present disclosure, a composite material having high incombustibility can be produced.

DESCRIPTION OF EMBODIMENTS

Exemplary embodiments of the present disclosure will be described.

1. Configuration of Composite Material

The composite material of the present disclosure contains a base material and an inorganic fiber. For example, the base material is impregnated into the inorganic fiber. The composite material is reinforced by the inorganic fiber.

The base material contains (a) a dehydration condensation reaction product of sodium silicate and (b) alumina cement. The component (a) is a product produced through a dehydration condensation reaction of sodium silicate. The component (a) is, for example, a compound having a skeleton in which siloxane bonds are linked. The component (a) includes, for example, siloxane. One hundred (100) parts by mass of sodium silicate becomes 60 parts by mass of the component (a) as a result of the dehydration condensation reaction.

A mass of the component (a) contained in the base material is preferably larger than a mass of the component (b) contained in the base material. When the mass of the component (a) is larger than the mass of the component (b), the incombustibility and strength of the composite material are higher.

The base material preferably contains 5 parts by mass or more and 25 parts by mass or less of the component (b) with respect to 100 parts by mass of the component (a). When the amount of the component (b) blended in the base material is within the above range, the strength of the composite material is further higher.

The base material may further contain other components. Examples of the other components include a Shirasu balloon and a silicate mineral. Examples of the silicate mineral include wollastonite.

The base material preferably contains 5 parts by mass or more and 20 parts by mass or less of the Shirasu balloon with respect to 100 parts by mass of the component (a). When the amount of the Shirasu balloon blended in the base material is within the above range, the composite material is more lightweight.

The base material preferably contains 5 parts by mass or more and 15 parts by mass or less of the silicate mineral with respect to 100 parts by mass of the component (a). When the amount of the silicate mineral blended in the base material is within the above range, heat resistance of the composite material is higher.

Examples of the inorganic fibers include glass fibers and basalt fibers. A form of the inorganic fiber is preferably a cross form. Examples of the inorganic fiber include a glass cloth made of glass fibers and a glass cloth made of basalt fibers. When glass fibers or basalt fibers are used as the inorganic fiber, the incombustibility of the composite material is further higher than that when aluminum fibers or alumina fibers are used. When basalt fibers are used as the inorganic fiber, mechanical strength of the composite material is higher. The reason why the mechanical strength is high is presumed to be because the basalt fibers are hardly attacked even when the base material is alkaline.

The inorganic fiber preferably does not contain a binder composed of an organic material. When the inorganic fiber does not contain a binder composed of an organic material, fuming and odor are less likely to occur from the composite material even when the composite material is heated to a temperature of 200° C. or higher.

2. Method for Producing Composite Material

The composite material of the present disclosure can be produced, for example, by a method basically similar to a conventional method for producing FRP. However, while a liquid resin composition is used in the conventional method for producing FRP, a solution containing (A) sodium silicate and (B) alumina cement (hereinafter, referred to as "base material solution") is used in the method for producing a composite material according to the present disclosure.

A mass of the component (A) contained in the base material solution is preferably larger than a mass of the component (B) contained in the base material solution. When the mass of the component (A) is larger than the mass of the component (B), the incombustibility of the produced composite material is further higher.

The base material solution preferably contains 5 parts by mass or more and 50 parts by mass or less of the component (B) with respect to 100 parts by mass of the component (A). When the amount of the component (B) blended in the base material solution is within the above range, the strength of the produced composite material is further higher.

The base material solution may further contain other components. Examples of the other components include a Shirasu balloon and a silicate mineral. Examples of the silicate mineral include wollastonite.

The base material solution preferably contains 5 parts by mass or more and 20 parts by mass or less of the Shirasu balloon with respect to 100 parts by mass of the component (A). When the amount of the Shirasu balloon blended in the base material solution is within the above range, the composite material is still more lightweight.

The base material solution preferably contains 5 parts by mass or more and 15 parts by mass or less of the silicate mineral with respect to 100 parts by mass of the component (A). When the amount of the silicate mineral blended in the base material solution is within the above range, the heat resistance of the composite material is further higher.

Examples of the method for producing a composite material include a production method including the following steps (1) to (4) (hereinafter, referred to as "first production method").

(1) Formation of Layered Product (i) The base material solution is uniformly applied to an inner surface of a production mold.

(ii) An inorganic fiber cloth is placed on a portion applied with the base material solution.

(iii) Using a mohair roller or the like, the base material solution is applied to the inorganic fiber cloth.

(iv) While air contained in the inorganic fiber cloth is removed using a defoaming roller or the like, an inorganic fiber mat is uniformly impregnated with the base material solution.

(v) A new inorganic fiber cloth is layered.

(vi) The steps (iii) to (iv) are performed on the new inorganic fiber cloth.

(vii) The steps (v) to (vi) are repeated until the number of layered inorganic fiber cloths reaches a predetermined number. Through the above steps, a layered product is formed.

(2) Dry Curing

The layered product, together with the production mold, is placed in a drying furnace at 70 to 100° C. for 5 hours. At this time, a solvent of the base material solution is vaporized, and the layered product is cured. The sodium silicate (A) contained in the base material solution becomes the component (a) through a dehydration condensation reaction. The component (a) is a dehydration condensation reaction product of sodium silicate. The alumina cement (B) contained in the base material solution functions as a curing accelerator. As a result, the layered product becomes a composite material. The composite material contains a base material and an inorganic fiber. The base material is impregnated into the inorganic fiber. The composite material is reinforced by the inorganic fiber. The base material contains the component (a) and the component (b).

(3) Demolding Work

A spatula or the like is used to form a gap between the production mold and the composite material. Air is blown into the gap using a compressor or the like. The composite material is then removed from the production mold. The composite material produced by the first production method is a molded article.

(4) Finishing Work

Unnecessary portions of the composite material are cut using an electric sander or the like.

3. Effect Exerted by Composite Material

The composite material of the present disclosure has higher incombustibility than that of conventional FRP. Also, the composite material of the present disclosure has high strength.

4. Example 1

(4-1) Production of Base Material Solution

Base material solutions S1 to S3 having the following compositions were produced. The methods for producing the base material solutions S1 to S3 are methods of mixing the respective components.

(Base Material Solution S1)

Sodium silicate JIS No. 3: 74.0 parts by mass

Shirasu balloon: 7.4 parts by mass

Silicate mineral (wollastonite): 7.4 parts by mass

Alumina cement: 11.2 parts by mass (Base Material Solution S2)

Sodium silicate JIS No. 3: 69.0 parts by mass

Shirasu balloon: 6.9 parts by mass

Silicate mineral (wollastonite): 6.9 parts by mass

Alumina cement: 17.2 parts by mass (Base Material Solution S3)

Sodium silicate JIS No. 3: 62.4 parts by mass

Shirasu balloon: 6.3 parts by mass

Silicate mineral (wollastonite): 6.3 parts by mass

Alumina cement: 25.0 parts by mass (4-2) Production of Composite Material

Using the base material solution S1, a composite material was produced by the first production method described above. Also, using the base material solution S2, a composite material was produced by the first production method described above. Also, using the base material solution S3, a composite material was produced by the first production method described above. Hereinafter, the composite materials produced using the base material solutions S1, S2, and S3 are referred to as composite materials S1, S2, and S3, respectively.

The inorganic fibers used in the production of the composite materials S1 to S3 were glass cloths (manufactured by Nitto Boseki Co., Ltd., product number: WF350-100-BS6). In the composite materials S1 to S3, the number of layered inorganic fiber cloths was 11. In the step of dry curing, the temperature in the drying furnace was 100° C.

(4-3) Evaluation of Composite Material

Each of the composite materials S1 to S3 was subjected to a tensile test in accordance with JIS K 7164 to measure tensile strength. The tensile strength of the composite material S1 was 50.4 MPa.

Each of the composite materials S1 to S3 was subjected to a bending test in accordance with JIS K 7171 to measure bending strength and bending elastic modulus. The bending strength of the composite material S1 was 108.3 MPa. The bending elastic modulus of the composite material S1 was 4.430 GPa.

Each of the composite materials S1 to S3 was subjected to a pyrogenicity test in accordance with ISO-5660. In the pyrogenicity test, the specimen was heated for 20 minutes. Radiant intensity was 50 kW/m².

The composite material S1 had a total amount of heat generated of 0.01 MJ/m², which was very small. The composite material S1 had a maximum heat generation rate of 0.33 kW/m², which was very low. After the pyrogenicity test, the specimen of the composite material S1 was not deformed. The specimen of the composite material S1 did not ignite. The results of the pyrogenicity test indicate that the composite material S1 has high incombustibility.

Each of the composite materials S1 to S3 was subjected to an incombustibility test in accordance with ISO-1182. The test method was as follows. A cylindrical electric furnace was prepared. In addition, a specimen was prepared. The specimen had a cylindrical shape with a diameter of 44.6 mm and a height of 47.5 mm. The mass of the specimen before the test was 125.46 g.

An internal temperature of the electric furnace was adjusted to 750±5° C. After the adjustment of the internal temperature of the furnace, the power consumption of the electric furnace was made constant. After the adjustment of the internal temperature of the furnace, the specimen was inserted into the furnace. After the insertion of the specimen, the internal temperature of the furnace, a center temperature of the specimen, and a surface temperature of the specimen were continuously measured. In addition, the mass of the specimen was measured before and after the test. In addition, the shape of the specimen was observed before and after the test. The test was continued until the internal temperature of the furnace reached a final equilibrium temperature. The final equilibrium temperature is an internal temperature of the furnace when the internal temperature of the furnace is in a stable state within a range of ±2° C. for 10 minutes.

In the composite material S1, a raised internal temperature of the furnace at the center of the specimen was 2° C. The raised internal temperature of the furnace is a value obtained by subtracting the final equilibrium temperature from a maximum internal temperature of the furnace. The maximum internal temperature of the furnace is the maximum value of the internal temperature of the furnace in a period from the insertion of the specimen to the end of the test.

In the composite material S1, the raised internal temperature of the furnace on a surface of the specimen was 2.8° C. In the composite material S1, a mass reduction rate WR of the specimen was 12.0%. The mass reduction rate WR is a value represented by the following Equation (1).

$$WR=((W1-W2)/W1)\times100 \qquad \text{Equation (1)}$$

In Equation (1), W1 is the mass of the specimen before the test. W2 is the mass of the specimen after the test.

In the composite material S1, the raised internal temperature of the furnace at the center of the specimen and the raised internal temperature of the furnace at the surface of the specimen were lower than 20° C., which is the standard in ISO-1182. In the composite material S1, the mass reduction rate WR was smaller than 30%, which is the standard in ISO-1182. In addition, in the composite material S1, the shape of the specimen after the test was not greatly changed as compared with the shape of the specimen before the test. The results of the incombustibility test indicate that the composite material S1 has high incombustibility.

5. Example 2

(5-1) Production of Base Material Solution

A base material solutions S4 having the following composition was produced. The method for producing the base material solution S4 is a method of mixing the respective components.

(Base Material Solution S4)

Sodium silicate JIS No. 3: 74.0 parts by mass

Shirasu balloon: 7.4 parts by mass

Silicate mineral (wollastonite): 7.4 parts by mass

Alumina cement: 7.4 parts by mass (5-2) Production of Composite Material

Using the base material solution S4, a composite material was produced by the first production method described above. Hereinafter, the composite material produced using the base material solution S4 is referred to as composite material S4.

The inorganic fibers used in the production of the composite material S4 were basalt fibers (manufactured by Allte Plus K.K., product number: AC1919G 102). The number of layered inorganic fibers was 11. In the step of dry curing, the temperature in the drying furnace was 100° C.

(5-3) Evaluation of Composite Material

The composite material S4 was subjected to a tensile test in accordance with JIS K 7164 to measure the tensile strength. The tensile strength of the composite material S4 was 34.1 MPa.

The composite material S4 was subjected to a bending test in accordance with JIS K 7171 to measure the bending strength and the bending elastic modulus. The bending strength of the composite material S4 was 57.1 MPa. The bending elastic modulus of the composite material S4 was 20.8 GPa.

6. Other Embodiments

Although the embodiments of the present disclosure have been described above, the present disclosure is not limited to the above-described embodiments, and can be implemented with various modifications.

(6-1) A plurality of functions of one component in the above embodiments may be realized by a plurality of components, or one function of one component may be realized by a plurality of components. In addition, a plurality of functions of a plurality of components may be realized by one component, or one function realized by a plurality of components may be realized by one component. A part of the configuration of the above embodiment may be omitted. At least a part of the configuration of the above embodiment may be added to or replaced with the configuration of another embodiment described above.

(6-2) In addition to the composite material described above, the present disclosure can also be realized in various forms such as a system including the composite material as a component.

The invention claimed is:

1. A composite material comprising a base material and an inorganic fiber, wherein the base material comprises a component (a) comprising a dehydration condensation reaction product of sodium silicate, and a component (b) comprising alumina cement, wherein a mass of the component (a) in the base material is larger than a mass of the component (b) in the base material, and wherein the base material further comprises one or more selected from the group consisting of: 5 parts by mass or more and 20 parts by mass or less of a Shirasu balloon with respect to 100 parts by mass of the component (a); and 5 parts by mass or more and 15 parts by mass or less of a silicate mineral with respect to 100 parts by mass of the component (a).

2. The composite material according to claim 1, wherein the base material contains 5 parts by mass or more and 25 parts by mass or less of the component (b) with respect to 100 parts by mass of the component (a).

3. A method for producing a composite material comprising a base material and an inorganic fiber, the method comprising:

impregnating the inorganic fiber with a solution comprising a component (A) comprising sodium silicate and a component (B) comprising alumina cement, wherein a mass of the component (A) is larger than a mass of the component (B), and wherein the solution further comprises one or more selected from the group consisting of: 5 parts by mass or more and 20 parts by mass or less of a Shirasu balloon with respect to 100 parts by mass of the component (A); and 5 parts by mass or more and 15 parts by mass or less of a silicate mineral with respect to 100 parts by mass of the component (A); and causing a dehydration condensation reaction of the component (A) to occur by heating.

4. The method for producing a composite material according to claim 3, wherein the base material solution contains 5 parts by mass or more and 50 parts by mass or less of the component (B) with respect to 100 parts by mass of the component (A).

5. The method for producing a composite material according to claim 3, wherein the dehydration condensation reaction of the component (A) occurs by heating in a drying furnace at 70° C. to 100° C. for 5 hours.

* * * * *